(12) United States Patent
Kataoka et al.

(10) Patent No.: US 6,429,234 B2
(45) Date of Patent: Aug. 6, 2002

(54) FOAM, AN INTERIOR MATERIAL MADE OF THE FOAM, A MOLDED ARTICLE DESTINED FOR AN INTERIOR VEHICULAR MATERIAL, AND PRODUCTION METHODS THEREOF

(75) Inventors: Akihiro Kataoka; Shunji Okubo; Toshiharu Nakae; Fusayoshi Akimaru, all of Shiga (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/180,549

(22) PCT Filed: Mar. 9, 1998

(86) PCT No.: PCT/JP98/00950

§ 371 (c)(1),
(2), (4) Date: Nov. 10, 1998

(87) PCT Pub. No.: WO98/41573

PCT Pub. Date: Sep. 24, 1998

(30) Foreign Application Priority Data

Mar. 14, 1997 (JP) .............................................. 9-061220
Aug. 25, 1997 (JP) .............................................. 9-228112

(51) Int. Cl.[7] .................................................. C08J 9/10
(52) U.S. Cl. ......................... 521/143; 521/83; 521/100; 521/142
(58) Field of Search .......................... 521/83, 100, 142, 521/143

(56) References Cited

U.S. PATENT DOCUMENTS

| | | | | |
|---|---|---|---|---|
| 4,252,906 A | * | 2/1981 | Hosokawa et al. | 521/143 |
| 5,234,962 A | * | 8/1993 | Grave et al. | 521/57 |
| 5,254,597 A | * | 10/1993 | Horn et al. | 521/51 |
| 6,107,355 A | * | 8/2000 | Horn et al. | 521/51 |

FOREIGN PATENT DOCUMENTS

JP  4-75604  3/1992

* cited by examiner

*Primary Examiner*—John M. Cooney, Jr.
(74) *Attorney, Agent, or Firm*—Schnader Harrison Segal & Lewis LLP

(57) ABSTRACT

The object is to obtain a foam, an interior material, and a molded article destined for an interior automotive or other vehicular material which can inhibit the formation of crystals in the fogging test.

The present invention is a foam, an interior material and a molded article destined for an interior vehicular material, comprising a fogging inhibitor, to keep the amount of the precipitate detected by the fogging test at 0.8 mg or less.

The foam and the interior material obtained according to the present invention can be suitably used as a dash board in front of the driver's seat, an interior material at the door and as an interior material of the ceiling in an automobile.

41 Claims, 1 Drawing Sheet

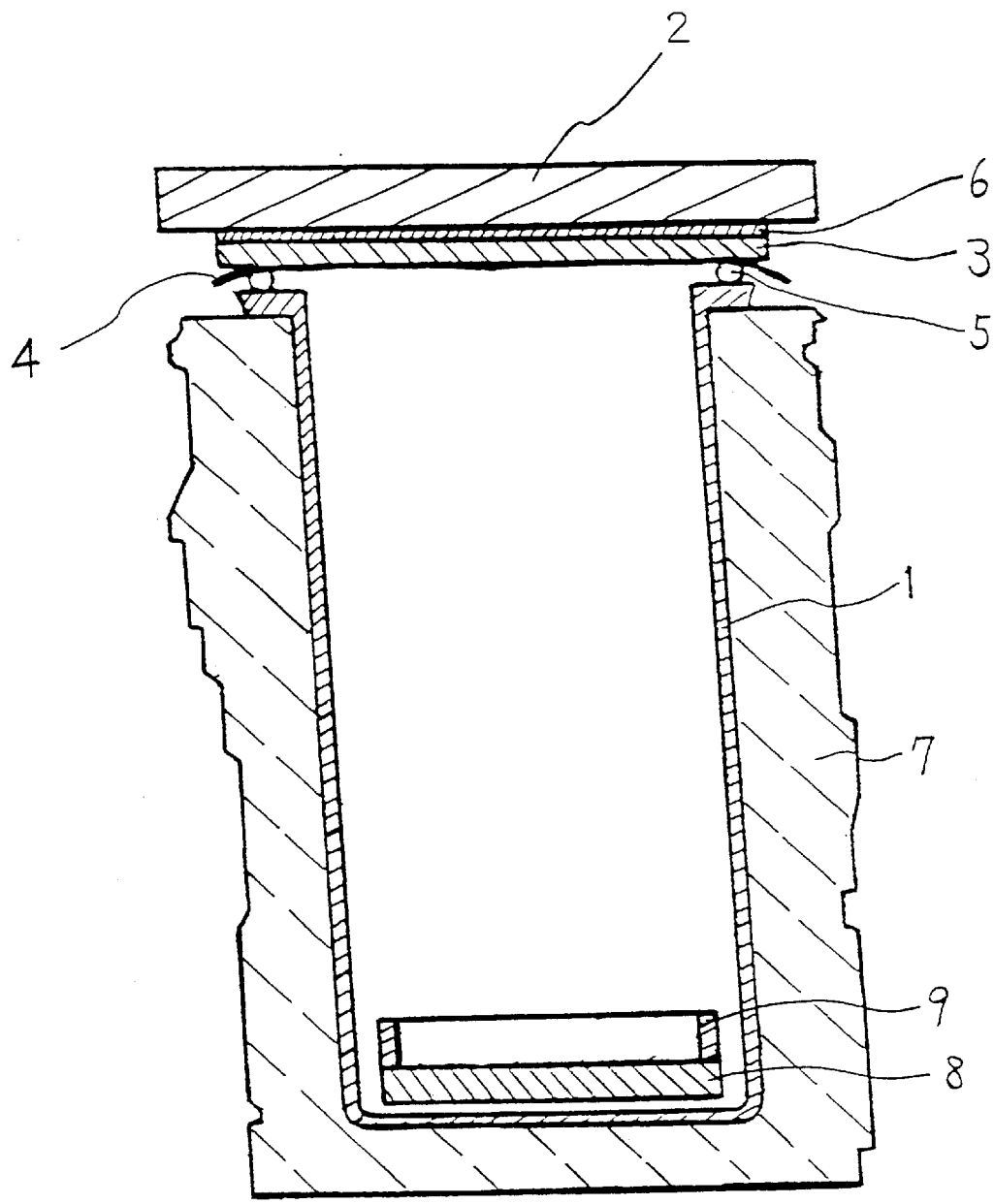

FOAM, AN INTERIOR MATERIAL MADE OF THE FOAM, A MOLDED ARTICLE DESTINED FOR AN INTERIOR VEHICULAR MATERIAL, AND PRODUCTION METHODS THEREOF

TECHNICAL FIELD

The present invention relates to a foam, an interior material and a molded article destined for an interior vehicular material substantially free from deterioration due to fogging.

In more detail, the present invention relates to a foam, an interior material and a molded article destined for an interior vehicular material which suffers little fogging deterioration as described later in the text (hereinafter called the fogging test), since the precipitation of urea, etc., otherwise causing fogging is inhibited.

Furthermore, the present invention relates to methods for producing such a foam, an interior material and a molded article destined for an interior vehicular material.

BACKGROUND ARTS

Interior materials obtained by using a foam, for example, polyolefin resin foam as a component are widely used.

Especially, they are widely used as interior materials of automobiles and other vehicles (e.g., the dash board in front is of the driver's seat, the interior material at the door, interior material of the ceiling) since they are light in weight and easy to mold.

In these applications, polyolefin resin foams are usually covered with a skin (such as a PVC sheet), when used as interior materials.

In the interior material area where these foams, etc. are used, in recent years, fogging draws attention.

The fogging is a phenomenon that plasticizers, crystalline materials, etc. used for producing the interior material are precipitated from the foam and the skin when the interior material is used. For example, in the case of a polyolefin resin foam, for example, the precipitation of urea and biurea as crystals causes fogging.

The fogging causes precipitation as a primary problem, and makes vehicular windows cloudy and gives an offensive odor as secondary problems.

No effective means for solving the problem of fogging has been found.

The reason is that the fogging has not been regarded as a serious problem to be solved, and therefore that no means for solving it has been studied.

DISCLOSURE OF THE INVENTION

A first object of the present invention is to solve the problem of fogging, by providing a foam, an interior material and a molded article destined for an interior vehicular material in which only a very small amount of precipitate is formed in a predetermined fogging test.

A second object of the present invention is to provide methods for producing a foam, an interior material and a molded article destined for an interior vehicular material which can solve the problem of fogging.

The foam, etc. of the present invention to achieve the above objects are constituted as described below.

The present invention provides a foam, comprising a fogging inhibitor, to keep the amount of the precipitate detected by the fogging test at 0.8 mg or less.

The present invention also provides an interior material, comprising a fogging inhibitor, to keep the amount of the precipitate detected by the fogging test at 0.8 mg or less.

The present invention also provides a molded article destined for an interior vehicular material, comprising a foam and a fogging inhibitor to keep the amount of the precipitate detected by the fogging test at 0.8 mg or less.

As a preferable embodiment of the above mentioned foam, interior material or molded article destined for an interior vehicular material of the present invention, the fogging inhibitor contained in the foam, interior material or molded article destined for an interior vehicular material is a sulfate.

As another preferable embodiment of the above mentioned foam, interior material or molded article destined for an interior vehicular material of the present invention, the fogging inhibitor contained in the foam, interior material or molded article destined for an interior vehicular material is a sulfate containing aluminum.

As a further other preferable embodiment of the above mentioned foam, interior material or molded article destined. for an interior vehicular material of the present invention, the fogging inhibitor contained in the foam, interior material or molded article destined for an interior vehicular material is a sulfate containing an alkali metal.

As a still further other preferable embodiment of the above mentioned foam, interior material or molded article destined for an interior vehicular material of the present invention, the fogging inhibitor contained in the foam, interior material or molded article destined for an interior vehicular material is alum.

As a still further other preferable embodiment of the above mentioned foam, interior material or molded article destined for an interior vehicular material of the present invention, the fogging inhibitor contained in the foam, interior material or molded article destined for an interior vehicular material has a porous structure.

As a still further other preferable embodiment of the above mentioned interior material of the present invention, a foam is used as a component of the interior material, and contains a fogging inhibitor.

As a still further other preferable embodiment of the above mentioned interior material of the present invention, a skin is used as a component of the interior material, and contains a fogging inhibitor.

In these embodiments, the interior material is formed by laminating the foam and the skin.

As a still further other preferable embodiment of the above mentioned interior material of the present invention, the interior material is formed by laminating a foam containing a fogging inhibitor and a skin containing a fogging inhibitor.

As a still further other preferable embodiment, the foam containing a fogging inhibitor contains the fogging inhibitor by 0.1 to 20 parts by weight per 100 parts by weight of the foam resin.

As a still further other preferable embodiment, the foam containing a fogging inhibitor is a polyolefin resin foam.

As a still further other preferable embodiment, the foam containing a fogging inhibitor is a polyolefin resin foam, and the polyolefin resin is mainly composed of polypropylene.

As a still further other preferable embodiment, the foam containing a fogging inhibitor is a crosslinked foam.

As a still further other preferable embodiment, the interior material has the fogging inhibitor contained in the skin resin by 0.1 to 20 parts by weight per 100 parts by weight of the skin resin.

As a still further other preferable embodiment, the interior material uses polyvinyl chloride as the skin containing a fogging inhibitor.

As a still further other preferable embodiment, the interior material uses a thermoplastic elastomer as the skin containing a fogging inhibitor.

As a still further other preferable embodiment of the above mentioned interior material of the present invention, an aggregate (core material) is laminated.

The method for producing a foam of the present invention comprises the step of adding a fogging inhibitor to a foamamble polyolefin resin composition when foaming it.

A version of the method for producing an interior material of the present invention comprises the use of a foam produced by adding a fogging inhibitor to a polyolefin based foamable resin composition, as a component of the interior material.

Another version of the method for producing an interior material of the present invention comprises the use of a skin containing a fogging inhibitor, as a component of the interior material.

A version of the method for producing a molded article destined for an interior vehicular material of the present invention comprises the use of a foam produced by adding a fogging inhibitor to a polyolefin based foamable resin composition, as a component of the molded article destined for an interior vehicular material.

Another version of the method for producing a molded article destined for an interior vehicular material of the present invention comprises the use of an interior material having a skin containing a fogging inhibitor, as a component of the molded article destined for an interior vehicular material.

BRIEF DESCRIPTION OF THE DRAWINGS

FIG. 1 is a schematic sectional view showing the outline of a fogging tester for inspecting the fogging phenomenon in the foam or interior material of the present invention.

THE BEST EMBODIMENTS OF THE INVENTION

Below are described in detail the foam, the interior material comprising the foam, the molded article destined for an interior vehicular material, the method for producing the foam, the method for producing the interior material and the method for producing the molded article destined for an interior vehicular material, respectively of the present invention.

The present invention-relates to a foam, an interior material and a molded article destined for an interior vehicular material. The foam contains a fogging inhibitor effective keep the amount of the precipitate detected by the standard fogging test at 0.8 mg or less.

In the present invention, the interior vehicular material consists of at least a foam and a skin.

In the present invention, the molded article destined for an interior material uses at least said interior material as a component and is molded for a specific vehicle, etc.

The foam of the present invention contains a fogging inhibitor effective to keep the amount of the precipitate detected by the fogging test at 0.8 mg or less, preferably 0.6 mg or less, most preferably 0.5 mg or less.

The interior material of the present invention contains a fogging inhibitor in the foam and/or the skin used to form the interior material, to keep the amount of the precipitate detected by the fogging test at 0.8 mg or less, preferably 0.6 mg or less, most preferably 0.5 mg or less.

The molded article destined for an interior automotive material keeps the amount of the precipitate detected by the fogging test at 0.8 mg or less, preferably 0.6 mg or less, most preferably 0.5 mg or less.

In the present invention, the foam or skin, etc. contains a fogging inhibitor effective to trap the substances likely to be precipitated from the foam and skin, by the fogging inhibitor, for decreasing the amount of the precipitate detected by the fogging test. The precipitate is mostly generated from the foam and skin, since it is derived from the plasticizers and crystalline substances used in the process for producing the foam and skin. The precipitate is mostly composed of crystals of precipitated substances.

In the foam, skin or the molded article destined for an interior automotive material of the present invention, it can be said to be good that the amount of the precipitate detected by the fogging test is as small as possible, as far as the properties as the foam are not impaired. The inventors found that the lower limit is generally about 0.3 mg, and as the case may be, the amount of the precipitate can be decreased to about 0.1 mg.

The fogging inhibitor used in the present invention refers to a substance capable of trapping the causal substances of the precipitate in the fogging test, by chemical reaction or physical adsorption. The precipitate includes, for example, crystals of urea and biurea, etc. as mentioned before.

For example, if urea is precipitated, a causal substance of the precipitate is ammonia. In this case, a substance capable of trapping ammonia can be the fogging inhibitor.

As the fogging inhibitor used in the present invention, a sulfate is preferable for achieving a higher effect, and above all, a sulfate or double salt containing an alkali metal belonging to group 1A of the periodic table is preferable. Most preferable is a sulfate or double salt containing aluminum. For example, alum or burnt alum is one of the most preferable fogging inhibitors.

As the fogging inhibitor, regarding the form of the substance, a porous substance is effective. The oxide of a transition metal element such as zinc oxide is also effective.

That is, a fogging inhibitor with a porous form or structure has large surface area per weight of the fogging inhibitor and can provide a high fogging inhibition effect preferably. In this sense, burnt alum obtained by burning alum to remove water of crystallization can be said to be more preferable.

An inorganic oxide containing a transition metal is effective since the foaming temperature can be lowered to decrease the production of ammonia gas. For example, an organic compound obtained from zinc oxide and a fatty acid like metallic soap, such as zinc stearate is effective.

In the present invention, it is preferable that the amount of the fogging inhibitor contained in the foam is 0.1 to 20 parts by weight per 100 parts by weight of the foam resin. A more preferable range is 1 to 10 parts by weight.

It is preferable that if the fogging inhibitor is contained in the skin of the interior material, the amount of the fogging inhibitor is 0.1 to 20 parts by weight per 100 parts by weight of the skin resin. A more preferable range is 1 to 10 parts by weight.

If the fogging inhibitor content exceeds 20 parts by weight per 100 parts by weight of the corresponding resin, resin kneadability becomes insufficient, and a foam with a homogeneous cell structure may not be obtained unpreferably. If the fogging inhibitor content is less than 0.1 part by weight per 100 parts by weight of the corresponding resin, the substances to cause fogging may not be sufficiently trapped unpreferably.

That is, according to the finding by the inventors, it is preferable that the fogging inhibitor content is 0.1 to 20 parts by weight per 100 parts by weight of the resin used to form at least one of the components of the interior material or the molded article destined to be an interior material. A more preferable range is 1 to 10 parts by weight.

The fogging inhibitor must of course have the effect of preventing fogging, but can also have other effects additionally.

For example, a fogging inhibitor which can prevent fogging and has a deodorizer effect or a deodorant effect can be preferably used. The foam, interior material or molded article destined for an interior material containing such a fogging inhibitor with a deodorizer effect or a deodorant effect can be more preferably used as an interior material for automobiles, etc.

A fogging inhibitor capable of preventing fogging and having a deodorizer effect or a deodorant effect can be, for example, active carbon. Active carbon is a practically excellent fogging inhibitor which can remove the odor of ammonia, etc. and has an effect of preventing the fogging caused by urea, etc.

According to the finding by the inventors, it is preferable that the active carbon has an average grain size of 5 $\mu$m to 150 $\mu$m, since the fogging preventive effect, deodorizer effect and deodorant effect can be manifested at high levels. It is more preferable to use active carbon with an average grain size of 10 $\mu$m to 100 $\mu$m. If the average grain size is larger than 150 $\mu$m, the elongation of the foam relative to the tensile force may decline unpreferably.

Alum also has a deodorizer effect, and can be suitably used in the interior material area for vehicles.

The method for adding the fogging inhibitor used in the present invention is not especially limited. It is preferable to add pellets containing a fogging inhibitor to the pellets of a resin.

The interior material of the present invention can be formed in various ways, for example, as an interior material consisting of a foam and a skin, or an interior material with a foam and a skin laminated, or an interior material having an aggregate additionally, or an interior material provided as a molded laminate, etc.

The foam used in the present invention can be a polyolefin resin foam, etc.

The polyolefin resin foam can be made of, for example, low density, medium to high density or straight chain low density polypropylene resin, polyethylene resin, ethylene copolymer with vinyl acetate, alkyl acrylate or propylene, etc., propylene homopolymer, propylene copolymer, chlorinated polyethylene, or any of their mixtures.

If the resin of the foam is a polyolefin resin,. a polypropylene based resin is especially preferable, and propylene homopolymer or a random, random-block or block propylene copolymer containing 1 to 30 wt % of an a-olefin such as ethylene or butene-1 is preferable. Any of these resins can also be mixed with another resin if the foam is not adversely affected. For example, low density, medium density or high density polyethylene, ethylene copolymer containing an $\alpha$-olefin or a copolymer consisting of ethylene as a main component and vinyl acetate or acrylate can also be mixed.

The foaming agent used is a compound liquid or solid at room temperature and decomposed or gasified when heated to higher than the melting point of a polypropylene based resin, and preferable is a compound which does not substantially disturb sheet formation or crosslinking reaction.

Especially a compound with a decomposition temperature of 180 to 240° C. is preferable. As such a thermally decomposing and foaming agent, azodicarbonamide, metal azodicarboxylate or dinitrosopentamethylenetetramine, etc. can be used. Among these foaming agents, azodicarbonamide is especially preferable. Such a foaming agent is used by 0.1 to 40 parts by weight, preferably 2 to 25 parts by weight per 100 parts by weight of the resin, and the amount mixed can be properly changed depending on the resin and foaming agent used, and the apparent density of the foam.

Crosslinking can be achieved by radiation crosslinking or a chemical crosslinking method using an organic peroxide. To promote the crosslinking, a polyfunctional monomer such as divinylbenzene or diallyl phthalate can also be added.

For mixing polypropylene resin, foaming agent, crosslinking accelerator, etc., for example, a Henschel mixer, super mixer or mixing roll mill, etc. can be used, or a kneading extruder can also be used. Especially when the resin is powdery, powder mixing by a Henschel mixer is convenient. Powder mixing is usually effected in a temperature range from room temperature to the softening temperature of the resin, and melt mixing is usually effected in a temperature range from the melt temperature of the resin to 195° C. When the foam is produced as a continuous sheet, extrusion molding can be used at lower than the decomposition temperature of the foaming agent, for molding into a sheet.

In the present invention, when a foam of a polypropylene based resin is used, the preferable apparent density of the foam is 0.025 to 0.2 g/cc. It can be calculated from Apparent density of foam={weight of 10 cm×10 cm×10 cm}/{Volume of 10 cm×10 cm×10 cm}

If the apparent density exceeds 0.2 g/cc, flexibility and feel may be poor unpreferably. On the other hand, if less than 0.025 g/cc, the material strength is low and collapse may occur unpreferably.

In the present invention, when a foam of a polypropylene based resin is used, it is preferable to use a polypropylene based resin foam with a gel fraction of 20% or more. A more preferable range is 45 to 60%. If the gel fraction is less than 20%, collapse may occur when the foam sheet is stuck since the material strength is low. If the gel fraction is more than 70%, sufficient foaming cannot be effected and flexibility and feel may become poor unpreferably.

In the present invention, the skin is not especially limited, but a fabric using natural or artificial fibers, polyvinyl chloride sheet, thermoplastic elastomer sheet, leather or mixed sheet of polyvinyl resin and ABS resin, etc. can be used. Especially preferable is a PVC sheet or thermoplastic elastomer sheet, etc.

The interior skin can contain proper amounts of a flame retarder, colorant, antioxidant, filler or slip agent, etc. as required.

The aggregate (core material) is not especially limited. To be adopted for stamping molding, a thermoplastic resin is suitable, and a polyolefin resin is preferable. Above all, considering heat resistance and mechanical strength, polypropylene resin, random, random-block or block propylene-$\alpha$-olefin copolymer resin, polyethylene, ethylene-$\alpha$-olefin copolymer resin, ethylene copolymer resin with vinyl acetate or acrylate, or any of their mixtures, etc. are preferable. Any of these resins can be mixed with an inorganic compound such as talc, silicic acid or calcium carbonate used as a filler if the properties as an aggregate resin are not impaired. To the aggregate resin, any proper thermostabilizer, antioxidant, nucleating agent or colorant, etc. can be added as required. Furthermore, if moldability is not impaired, any other resin than olefin resins such as ABS resin, polystyrene resin or petroleum resin can also be added.

As for the molding method, hot stamping molding is preferable since it allows a lower molding pressure to be set than injection molding.

In the present invention, the fogging test is performed according to the method described in the following (1). of the polypropylene based resin foam is measured according to the method described. The odor is evaluated according to the method described in the following (2).

(1) Fogging Test

Fogging was caused under certain heating conditions according to "SAE J1756 problemd 1994-12, Test Procedure to Determine the Fogging Characteristics of Interior Automotive Materials", one of the SAE Technical Standards, using a fogging tester of Haake Buchier Instruments (Germany), and the amount from precipitate formed by fogging was measured.

An outline of the fogging tester is shown in FIG. 1. An aluminum foil 4 (with a diameter of 103 mm and a thickness of 0.025 mm) was installed inside an inside glass sheet 3 of a cooling plate 2 placed above a beaker 1 containing a sample. Symbol 5 denotes a silicone rubber seal, and filter paper 6 (K. K. Wako Junyaku) made of cellulose as used for ordinary filtration was held between the cooling plate 2 and the glass sheet 3.

The beaker 1 containing a sample was kept at 103° C. by a heating unit 7 provided as a silicone bath, and in the test of the present invention, the heating conditions were held at for 16 hours.

The test sample 8 was a foam when the amount precipitated in the foam by fogging was to be measured, or an interior material when the amount precipitated in the interior material was to be measured, or a molded article destined for an interior material when the amount precipitated in the molded article was to be measured. The size of the sample was as described below.

The test sample was prepared as a circular sample with a diameter of 80 mm. In this test, it was not intended to keep the thickness and weight of the test sample 8 at certain values, and a foam, interior material or molded article destined for an interior material was tested as it was, except that it was formed as a circle with a diameter of 80 mm.

That is, the foam, interior material or molded article destined for an interior material in its actually used structure and thickness was prepared to be a circle with a diameter of 80 mm, to evaluate the absolute fogging characteristics.

Usually, the foams, interior materials and molded articles destined for interior materials are about 1 mm to 7 mm in thickness, mostly 1 mm to 4 mm. Therefore, it cannot happen that the test itself becomes impossible.

On the test sample 8, a metallic ring 9 (stainless steel, having an outer diameter of 80 mm and an inner diameter of 74 mm) accessory to the fogging tester was placed to prevent the sample from being curled during testing.

The measuring atmosphere was 21° C.±2° C. and 56%+5% humidity. The cooling plate 2 was constantly kept at 21° C.

After heating at 100° C. for 16 hours, the beaker was taken out of the heating unit and cooled to room temperature (20° C.) taking 1 hour, and the precipitate formed on the aluminum foil was weighed. The weight of the precipitate was calculated by obtaining the difference between the weight of the aluminum foil before testing and that after testing.

The average value of five samples was adopted in each example.

For testing, in the case of a foam, the sample was placed in the beaker without considering the top and bottom. On the other hand, in the case of an interior material or a molded article destined for an interior material, the sample was placed in the beaker with the skin side such as PVC sheet side turned upward considering the actual state of use.

(2) Odor Test

Two grams of a foam was cut into 1 cm×1 cm pieces, and all the cut pieces were supplied into a 100 cc Erlenmeyer flask. The flask was covered, heated in a hot air dryer at 80° C. for 2 hours, cooled at room temperature (20° C.) for 10 minutes, and uncovered, to confirm the odor intensity.

The odor intensity was evaluated in levels of 1 to 5 according to "Japan Environmental Sanitation Center, Research Report on the Measurement, etc. of Offensive Odor Substances (research commissioned by Environment Agency in 1979)", p.248–250 (1980).

An odor intensity closer to 1 is weaker and that closer to 5 is stronger.

EXAMPLES

The present invention is described below concretely in reference to examples.

In the following examples, the alum as a fogging inhibitor was added as mixed pellets consisting of 30 wt % of alum and 70 wt % of low density polyethylene resin.

For foaming, salt foaming was used.

Examples 1 to 5

Fifteen parts by weight of azodicarbonamide as a foaming agent, 4 parts by weight of divinylbenzene as a crosslinking aid and 0.2 part by weight of a phenol based additive (trade name: Irganox 1010) as a stabilizer were added to 80 parts by weight of propylene resin (melt index 2.0) and 20 parts by weight of low density polyethylene (density 0.915, melt index 8.0), and furthermore burnt alum as a fogging inhibitor was added by different amounts, to prepare five mixtures. The amounts of the fogging inhibitor added were respectively 0.1 part by weight (Example 1), 0.5 part by weight (Example 2), 1.0 part by weight (Example 3), 3.0 parts by weight (Example 4) and 5.0 parts by weight (Example 5).

Any of the mixtures was preliminarily mixed by a Henschel mixer, and the mixture was supplied into a single screw extruder (L/D=25) with a screw diameter of 90 mm. At an average resin temperature of 180° C., the mixture was kneaded and extruded from a T die, to obtain a 0.75 mm thick 410 mm wide resin composition sheet to be foamed. In this way, five sheets different in fogging inhibitor content were molded.

Any of the resin composition sheets to be foamed was irradiated with an electron dose of 5 Mrad using an electron beam irradiation unit (800 kV), to be crosslinked.

The respective crosslinked sheets were heated at about 240° C. in a foaming unit, to produce five crosslinked foam sheets different in fogging inhibitor content.

On the other hand, to produce a skin, 40 parts by weight of dioctyl phthalate as a plasticizer and 3 parts by weight of dibutyltin dimaleate as a stabilizer were homogeneously mixed with 100 parts by weight of polyvinyl chloride resin with a polymerization degree of 800, and the mixture was molded into a 0.4 mm thick PVC sheet by the calender roll method.

The PVC sheet was stuck onto one side of each of the five crosslinked foam sheets using a polyester based adhesive, and on the other side, polypropylene resin (melt index=50) molten at 220° C. was placed as aggregate. The laminate was integrally molded by hot stamping molding. In this way, five interior materials consisting of skin/foam/aggregate were prepared.

Comparative Example 1

An interior material was prepared as described for Examples 1 to 5, except that the fogging inhibitor was not contained in the foam.

The above six (Examples 1 to 5 and Comparative Example 1) interior materials different in fogging inhibitor content were tested to examine the amounts of the precipitate formed as fogging.

As a result, a precipitate mainly consisting of crystals from the foam only was observed by 0.79 mg in Example 1, 0.72 mg in Example 2, 0.65 mg in Example 3, 0.45 mg in Example 4, 0.20 in Example 5 and 1.51 mg in Comparative Example 1.

It can be said that especially in Examples 1 to 5 of the present invention, the precipitate was little formed, to show a large effect of fogging prevention.

Examples 6 to 10

A foam was produced as described in Comparative Example 1.

Skins to be stuck to the foam were produced as described for Comparative Example 1, except that the amounts of burnt alum added as a fogging inhibitor per 100 parts by weight of PVC resin were 0.1 part by weight (Example 6), 0.5 part by weight (Example 7), 1.0 part by weight (Example 8), 3.0 parts by weight (Example 9) and 5.0 parts by weight (Example 10). The above five skins formed by PVC sheets different in fogging inhibitor content were used to mold interior materials as described for Comparative Example 1.

Comparative Example 2

An interior material was molded as described for Examples 6 to 10, except that the skin did not contain the fogging inhibitor. That is, an interior material using a foam not containing the fogging inhibitor was produced.

The above six (Examples 6 to 10 and Comparative Example 2) interior materials different in fogging inhibitor content were tested to examine the amounts of the precipitate formed as fogging.

In the six interior materials, neither the foam nor the aggregate resin contained the fogging inhibitor.

As a result, a precipitate mainly composed of crystals from polyvinyl chloride and the foam was observed by 0.59 mg in Example 6, 0.53 mg in Example 7, 0.45 mg in Example 8, 0.24 mg in Example 9, 0.10 mg in Example land 1.20 mg in Comparative Example 2.

It can be said that especially in Examples 6 to 10 of the present invention, the precipitate was little formed, to show a large effect of fogging prevention.

Examples 11 to 15

Ten parts by weight of azodicarbonamide as a foaming agent, 4 parts by weight of divinylbenzene as a crosslinking aid and 0.2 part by weight of Irganox 1010 as a thermostabilizer were added to 80 parts by weight of a propylene based resin (melt index 2.0) with 4 wt % of ethylene random-copolymerized with propylene and 20 parts by weight of low density polyethylene (density 0.915, melt index 8.0), and furthermore, burnt alum was added as a fogging inhibitor by 0.1 part by weight (Example 11), 0.5 part by weight (Example 12), 1.0 part by weight (Example 13), 3.0parts by weight (Example 14) and 5.0 parts by weight (Example 15), to prepare five resins to be foamed.

Any of these resins was preliminarily mixed by a Henschel mixer, and the mixture was supplied into a single screw extruder (L/D=25) with a screw diameter of 90 mm. With the average resin temperature kept at 180° C. or lower to prevent the decomposition of the foaming agent, the mixture was kneaded and extruded from a T die, for molding into a 1.75 mm thick 410 mm wide resin composition sheet to be foamed. In this way, five sheets different in fogging inhibitor content were produced.

The respective resin composition sheets to be foamed were irradiated with an electron dose of 5 Mrad using an electron beam irradiation unit (800 kV), to be crosslinked.

The respective crosslinked resin composition sheets to. be foamed were heated at higher than the decomposition temperature of the foaming agent, i.e., about 230 to 240° C., to produce crosslinked foams.

Comparative Example 3

A foam was produced as described for Examples 11 to 15, except that the fogging inhibitor was not contained.

The above six (Examples 11 to 15 and Comparative Example 3) foams had a 0.6 mm PVC sheet bonded on one side and tested with the PVC sheet side turned upward, to examine the amounts of the precipitate formed as fogging.

As a result, a precipitate mainly composed of crystals from polyvinyl chloride and the foam was observed by 0.70 mg in Example 11, 0.68 mg in Example 12, 0.56 mg in Example 13, 0.40 mg in Example 14, 0.26 mg in Example 15 and 1.32 mg in Comparative Example 3.

It can be said that especially in Examples 11 to 15 of the present invention, the precipitate was little formed, to show a large effect of fogging prevention.

Examples 16 to 18

Azodicarbonamide as a foaming agent was added to 80 parts by weight of a propylene based resin (melt index 2.0) with 4 wt % of ethylene random-copolymerized with propylene and 20 parts by weight of low density polyethylene (density 0.915, melt index 8.0), by 5 parts by weight (Example 16), 10 parts by weight (Example 17) and 15 parts by weight (Example 18). Furthermore, 4 parts by weight of divinylbenzene as a crosslinking aid and 0.2 part by weight of Irganox 1010 as a thermostabilizer were added, and also 5.0 parts by weight of burnt alum were added, to prepare three resins to be foamed.

Any of the resins was preliminarily mixed in a Henschel mixer, and the mixture was supplied into a single screw extruder (L/D=25) with a screw diameter of 90 mm. With the average resin temperature kept at 180° C. or lower to prevent the decomposition of the foaming agent, the mixture was kneaded and extruded from a T die, to obtain 1.75 mm thick 410 mm wide resin composition sheet to be foamed. In this way,three sheets different in foaming agent content were prepared.

The respective resin composition sheets to be foamed were irradiated with an electron dose of 5 Mrad using an electron beam irradiation unit (800 kV), to be crosslinked.

The respective crosslinked resin composition sheets to be foamed were heated at higher than the decomposition temperature of the foaming agent, i.e., about 230 to 240° C., to produce crosslinked foams.

Comparative Examples 4 to 6

Foams were produced as described for Examples 16 to 18, except that the fogging inhibitor was not contained. The fogging agent contents were 5 parts by weight in Comparative example 4, 10 parts by weight in Comparative Example 5 and 15 parts by weight in Comparative Example 6.

The above six (Examples 16 to 18 and Comparative Examples 4 to 6) foams were tested as they were, to examine the amounts of the precipitate formed as fogging.

In this case, the amounts of the precipitate formed from the foams only were examined.

As a result, a precipitate mainly composed of crystals from polyvinyl chloride and the foam was observed by 0.10 mg in Example 16, 0.16 mg in Example 17, 0.2 mg in Example 18, 1.08 mg in Comparative Example 4, 1.38 mg in Comparative Example 5 and 1.51 mg in Comparative Example 6.

It can be said that especially in Examples 16 to 18 of the present invention, the precipitate was little formed, to show a large effect of fogging prevention.

Examples 19 to 23

Ten parts by weight of azodicarbonamide as a foaming agent, 4 parts by weight of divinylbenzene as a crosslinking aid and 0.2 part by weight of Irganox 1010 as a stabilizer were added to 80 parts by weight of a propylene based resin (melt index 2.0) with 4 wt % of ethylene random-copolymerized with propylene and 20 parts by weight of low density polyethylene (density 0.915, melt index 8.0), and zinc oxide as a fogging inhibitor was added by 0.1 part by weight (Example 19), 0.5 part by weight (Example 20), 1.0 part by weight (Example 21), 3.0 parts by weight (Example 22) and 5.0 parts by weight (Example 23), to prepare five resins to be foamed.

Any of these resins was preliminarily mixed in a Henschel mixer, and the mixture was supplied into a single screw extruder (L/D=25) with a screw diameter of 90 mm. With the average temperature kept at 180° C. or lower, the mixture was kneaded and extruded from a T die, to mold a 1.75 mm thick 410 mm wide resin composition sheet to be foamed. In this way, five sheets different in fogging inhibitor content were prepared.

The respective resin composition sheets to be foamed were irradiated with an electron dose of 5 Mrad using an electron beam irradiation unit (800 kV), to be crosslinked.

The respective crosslinked sheets were heated at about 230 to 240° C. in a foaming unit, to produce crosslinked foams.

Comparative Example 7

A foam was molded as described for Examples 19 to 23, except that the foam did not contain the fogging inhibitor.

The above six (Examples 19 to 23 and Comparative Example 7) foams were used to prepare interior materials respectively consisting an aggregate, foam and skin, and the amounts of crystals formed were examined by the fogging test.

As a result, a precipitate mainly composed of crystals from polyvinyl chloride and the foam was observed by 0.76 mg in Example 19, 0.72 mg in Example 20, 0.69 mg in Example 21, 0.50 mg in Example 22, 0.51 mg in Example 23 and 1.56 mg in Comparative Example 7.

It can be said that especially in Examples 19 to 23 of the present invention, the precipitate was little formed, to show a large effect of fogging prevention.

Examples 24 to 26

Ten parts by weight of azodicarbonamide as a foaming agent, 4 parts by weight of divinylbenzene as a crosslinking aid and 0.2 part by weight of Irganox 1010 as a thermostabilizer were added to 80 parts by weight of a propylene based resin (melt index 2.0) with 4 wt % of ethylene random-copolymerized with propylene and 20 parts by weight of low density polyethylene (density 0.915, melt index 8.0), and furthermore, active carbon with an average grain size of 57 μm was added as a fogging inhibitor with a deodorizer effect by 3.0 parts by weight (Example 24), 5.0 parts by weight (Example 25) and 7.5 parts by weight (Example 26), to obtain three resins to be foamed.

Any of the resins was preliminarily mixed in a Henschel mixer, and the mixture was supplied into a single screw extruder (L/D=25) with a screw diameter of 90 mm. With the average resin temperature kept at 180° C. or lower to prevent the decomposition of the foaming agent, the mixture was kneaded and extruded from a T die, to mold a 1.75 mm thick 410 mm wide resin composition to be foamed. In this way, five sheets different in fogging inhibitor content were prepared.

The respective resin composition sheets to be foamed were irradiated with an electron dose of 5 Mrad using an electron beam irradiation unit (800 kV), to be crosslinked.

The respective crosslinked resin composition sheets to be foamed were heated at higher than the decomposition temperature of the foaming agent, i.e., about 230 to 240° C. in a foaming unit, to produce crosslinked foams.

Comparative Example 8

A foam was produced as described for Examples 24 to 26, except that active carbon was not contained.

The above four (Examples 24 to 26 and Comparative Example 8) foams were tested as described before to examine the odor intensity levels.

As a result, the odor intensity was level 3 in Example 24, level 1 in Example 25, level 1 in Example 26, and level 4.5 in Comparative Example 8.

Furthermore, the above four foams were tested to examine the amounts of the crystals formed as fogging.

As a result, a precipitate mainly composed of crystals from the plasticizer and the foam was observed by 0.78 mg in Example 24, 0.54 mg in Example 25, 0.53 mg in Example 26 and 1.5 mg in Comparative Example 8.

It can be said that especially in Examples 24 to 26 of the present invention, the precipitate was little formed, to show a large effect of fogging prevention, and also the deodorizer effect was good.

Industrial Applicability

The present invention relates to a foam, an interior material and a molded article destined for an interior vehicular material, particularly a foam, an interior material, etc. practically free from the problem of fogging.

The foam, interior material and molded article destined for an interior vehicular material of the present invention can be widely used, for example, as interior materials of vehicles such as a dash board in front of the driver's seat, an interior material at the door, an interior material of the ceiling in an automobile, in view of fogging prevention effect, deodorizer effect, lightness in weight, easy moldability, etc.

What is claimed is:

1. A foam, comprising as polyolefin foam body containing 0.1 to 20 parts by weight of fogging inhibitor per 100 parts by weight of foam, said fogging inhibitor being selected from the group consisting of a sulfate containing an alkali metal and/or an aluminum, and an active carbon.

2. A foam, according to claim 1, wherein the fogging inhibitor is a sulfate containing aluminum.

3. A foam, according to claim 1, wherein the fogging inhibitor is a sulfate containing an alkali metal.

4. A foam, according to claim 1, wherein the fogging inhibitor is alum.

5. A foam, according to claim 1, wherein the fogging inhibitor has a porous structure.

6. A foam, according to claim 1, wherein the foam containing the fogging inhibitor comprises a polyolefin based resin foam, and wherein the main component of the polyolefin in based resin is polypropylene.

7. A foam, according to claim 1, which comprises a crosslinked foam.

8. An interior material, comprising a polyolefin foam and a fogging inhibitor which is selected from the group consisting of a sulfate containing an alkali metal and/or an aluminum, and an active carbon said fogging inhibitor being present in the amount of 0.1 to 20 parts by weight per 100 parts of foam by weight.

9. An interior material, according to claim 8, wherein the fogging inhibitor comprises a sulfate containing aluminum.

10. An interior material, according to claim 8, wherein the fogging inhibitor comprises a sulfate containing an alkali metal.

11. An interior material, according to claim 8, wherein the fogging inhibitor comprises alum.

12. An interior material, according to claim 8, wherein the fogging inhibitor has a porous structure.

13. An interior material, according to claim 8, wherein a foam comprises a component of the interior material and contains a fogging inhibitor.

14. An interior material, according to claim 8, wherein a skin is present as a component of the interior material and contains a fogging inhibitor.

15. An interior material, according to claim 14, wherein the skin comprises polyvinyl chloride.

16. An interior material, according to claim 14, wherein the skin containing a fogging inhibitor comprises a thermoplastic elastomer.

17. An interior material, according to claim 14, wherein the fogging inhibitor is present in an amount of 0.1 to 20 parts by weight per 100 parts by weight of the skin resin.

18. An interior material, according to claim 8, wherein the foam containing a fogging inhibitor and the skin containing a fogging inhibitor are laminated.

19. An interior material, according to claim 14, wherein the fogging inhibitor is present in the foam resin in an amount of 0.1 to 20 parts by weight per 100 parts by weight of the foam resin and the fogging inhibitor is present in an amount of 0.1 to 20 parts by weight per 100 parts by weight of the skin resin.

20. An interior material, according to claim 8, wherein the foam contains the fogging inhibitor and is a polyolefin based resin foam, and the main component of the polyolefin based resin is polypropylene.

21. An interior material, according to claim 8, wherein the foam contains the fogging inhibitor and is a crosslinked foam.

22. An interior material, according to claim 8, to which an aggregate is laminated.

23. A molded article destined for an interior vehicular material, comprising a polyolefin foam and a fogging inhibitor which is selected from the group consisting of a sulfate containing an alkali metal and/or an aluminum, and an active carbon said fogging inhibitor being present in the amount of 0.1 to 20 parts by weight per 100 parts of foam by weight.

24. A molded article destined for an interior vehicular material, according to claim 23, wherein the fogging inhibitor comprises a sulfate containing aluminum.

25. A molded article destined for an interior vehicular material, according to claim 23, wherein the fogging inhibitor comprises a sulfate containing an alkali metal.

26. A molded article destined for an interior vehicular material, according to claim 23, wherein the fogging inhibitor comprises alum.

27. A molded article destined for an interior vehicular material, according to claim 23, wherein the fogging inhibitor has a porous structure.

28. A molded article destined for an interior vehicular material, comprising the interior material defined in claim 11.

29. A molded article destined for an interior vehicular material, according to claim 23, wherein the foam contains the fogging inhibitor and comprises a polyolefin based resin foam, and wherein the main component of the polyolefin resin comprises polypropylene.

30. A molded article destined for an interior vehicular material, according to claim 23, wherein the foam contains the fogging inhibitor and comprises a crosslinked foam.

31. A method for producing a foam as defined in claim 1, comprising the step of adding said fogging inhibitor to a polyolefin based foamable resin composition when foaming the composition.

32. A method for producing an interior material as defined in claim 8, comprising adding said fogging inhibitor to a polyolefin based foamable resin composition, to form a component of the interior material.

33. A method for producing an interior material as defined in claim 8, comprising providing a skin containing said fogging inhibitor, as a component of the interior material.

34. A method for producing a molded article destined for an interior vehicular material as defined in claim 23, comprising forming a foam produced by adding said fogging inhibitor to a polyolefin based foamable resin composition, as a component of the molded article.

35. A method for producing a molded article destined for an interior vehicular material as defined in claim 23, comprising forming an interior material having a skin containing said fogging inhibitor, as a component of the molded article.

36. A foam, comprising a polyolefin foam body containing fogging inhibitor, said fogging inhibitor being present in an amount to keep the amount of the precipitate detected by a fogging test at 0.8 mg or less, wherein said fogging test is carried out according to SAE J1756 (1994-12).

37. An interior material, comprising a polyolefin foam and a fogging inhibitor, said fogging inhibitor being present in an amount to keep the amount of the precipitate detected by a fogging test at 0.8 mg or less, wherein said fogging test is carried out according to SAE J1756 (1994-12).

38. A molded article destined for an interior vehicular material, comprising a polyolefin foam and a fogging inhibitor, said fogging inhibitor being present in an amount to keep the amount of the precipitate detected by a fogging test at 0.8 mg or less, wherein said fogging test is carried out according to SAE J1756 (1994-12).

39. The foam according to claim 1 wherein said fogging inhibitor is a sulfate containing aluminum.

40. The interior material according to claim 8, wherein said fogging inhibitor is a sulfate containing aluminum.

41. The molded article of claims 23, wherein said fogging inhibitor is a sulfate containing aluminum.

* * * * *

UNITED STATES PATENT AND TRADEMARK OFFICE
CERTIFICATE OF CORRECTION

PATENT NO.   : 6,429,234 B2
DATED        : August 6, 2002
INVENTOR(S)  : Kataoka et al.

It is certified that error appears in the above-identified patent and that said Letters Patent is hereby corrected as shown below:

Column 1,
Line 37, please change "that" to -- wherein --.

Column 5,
Line 59, please change "a-olefin" to -- α-olefin --.

Column 7,
Line 22, please change "of" to -- from -- and "Buchier" to -- Buchler --;
Line 33, please change "103ºC" to -- 100ºC --; and
Line 36, please insert -- 100ºC --.

Signed and Sealed this

Eleventh Day of March, 2003

JAMES E. ROGAN
*Director of the United States Patent and Trademark Office*